3,051,047
DEVICE FOR THE SUSPENSION OF A TELESCOPE ON A VEHICLE
Jean Fieux, Paris, France, assignor of one-half to Société des Forges et Ateliers du Creusot, Paris, France, a company of France
Filed Dec. 15, 1959, Ser. No. 859,703
Claims priority, application France Dec. 23, 1958
8 Claims. (Cl. 88—36)

The present invention relates to a device for the suspension and pointing of a telescope on a vehicle which is subject to vibration such as a helicopter, said device enabling the observer, for example the co-pilot, to find and hold in the optical field, the image of a remote target and, where appropriate, to observe continuously the trajectory of a missile in order that he himself may guide it.

According to the invention, the device comprises a bracket fixed to the observer's seat, an arm rigidly connected to the telescope and, between the bracket and the arm, an articulation having two degrees of freedom in relation to the bracket, one as regards bearing and the other as regards elevation, the arm and telescope assembly being balanced in such a manner as to be in substantially neutral equilibrium about the centre of the articulation having two degrees of freedom, and sufficient space being left between the eye-piece and the space occupied by said articulation to permit the observer to place his head there while taking the sight.

Other features of the invention will be apparent from the following description of a means of pointing the telescope by remote action, of a means of connecting the bracket and the co-pilot's helmet through a brace, and of a means of finding and indicating at a distance the approximate bearing of the telescope which the pilot must take into consideration in order to orientate the helicopter to the best advantage to facilitate the sighting.

Figure 1:
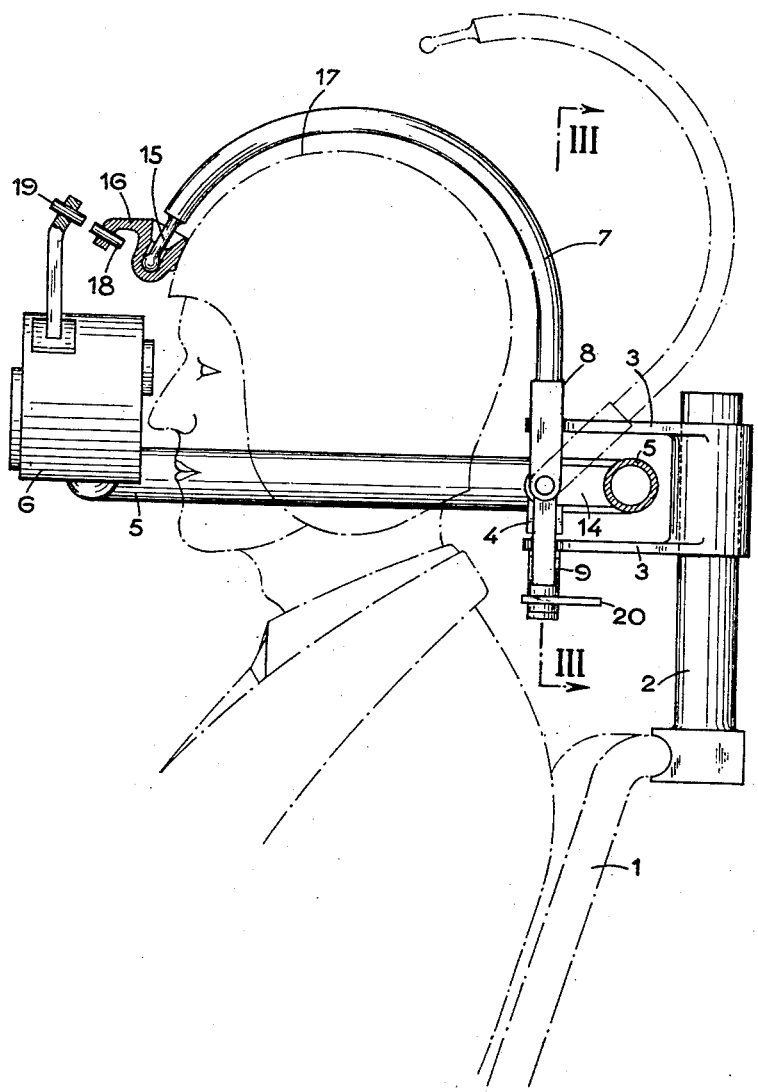
FIGURE 1 is a view along I—I in FIGURE 2, of the device according to the invention comprising a high-magnification telescope, the broken lines representing the back of the seat, the silhouette of the co-pilot in the sighting position and the helmet brace in the raised position.
Figure 2:
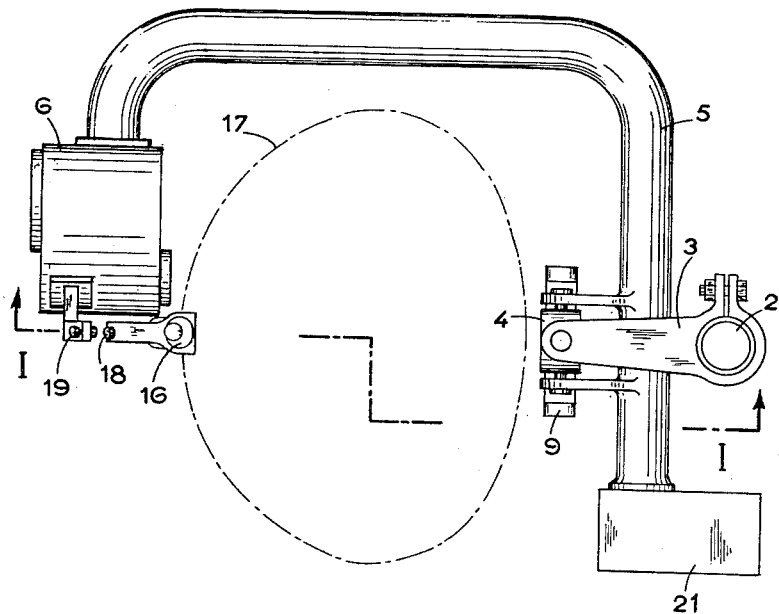
FIGURE 2 is a plan view of the device shown in FIGURE 1, the brace being omitted, the apparent outline of the helmet being illustrated by a broken line.
Figure 3:
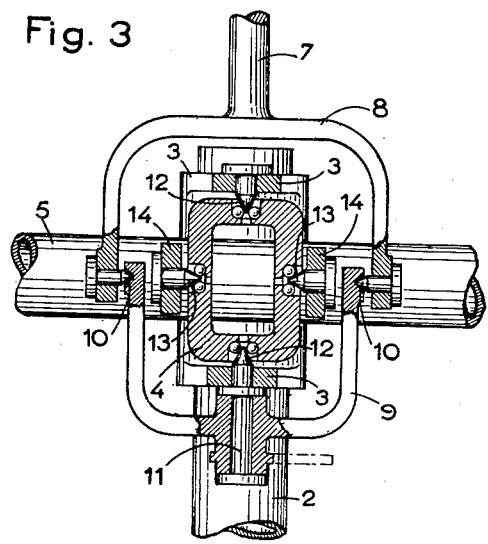
FIGURE 3 is a partial section on III—III in FIGURE 1, through the articulations connecting the helmet brace and the arm carrying the telescope to the bracket.

The co-pilot's seat 1 is rigidly connected to a post 2 to which is fixed a bracket 3 which carries, by means of a freely rotating universal-joint frame 4, an arm 5 which is rigidly connected to a telescope 6.

The bracket 3 also carries a brace 7, by means of forks 8 and 9 which are articulated together at their ends along a horizontal axis embodied by two pivots 10, the fork 8 being rigidly connected to said brace while the fork 9 is pivoted on the bracket about a vertical pin 11.

The frame 4 pivots freely about two axes which are perpendicular and intersecting. One of these axes is vertical and is embodied by pivots 12 carried by the bracket 3, while the other axis is horizontal and is embodied by pivots 13 carried by lugs 14 rigidly connected to the arm 5.

The imaginary meeting point of the pivotal axes 12 and 13 of the frame 4 coincides with the imaginary meeting point of the axes of articulation 10 and 11 of the fork 9.

The free end of the brace comprises a ball-joint 15 engaging freely in the appropriately shaped socket in an appendage 16 fixed to the front portion of the observer's helmet 17 and carrying a bar magnet 18. The telescope 6 itself carries a bar magnet 19.

The bars 18 and 19 are substantially in the extension of one another when the device and the observer are in the normal position for sighting. Their adjacent ends are of opposite polarity and separated by an air gap which can easily be adjusted.

The boss of the fork 9 comprises a lever 20 which may serve to transmit to the pilot an angle substantially equal to the bearing of the telescope.

The device is completed by a counterpoise 21 for the arm 5 carrying the telescope 6. The assembly comprising the weight 21, the arm 5 and the telescope 6 is balanced in such a manner that its centre of gravity is situated substantially in the imaginary centre of the articulation having two degrees of freedom, that is to say at the imaginary meeting point of the axes 12 and 13 of articulation of the universal-joint frame 4. It follows that this assembly is in neutral equilibrium about this meeting point.

The support according to the invention has the advantage of applying directly to the pivotal axes 12 and 13 of the sighting apparatus, the forces of inertia resulting from the small orbital movements maintained by the vibrations of the fuselage and so of avoiding the formation of high frequency alternating couples which would be liable to blur the image. This advantage, which is of prime importance for the use of a high-magnification telescope, is all the better assured by the support according to the invention in that the suspension in neutral equilibrium of the orientable assembly can be established definitely and with all the precision necessary; because, contrary to what is found in a camera stand, for example, said assembly does not comprise any mass capable of displacement during the sighting and need only be balanced in relation to two clearly defined axes 12 and 13 by the careful machining of a member of simple form: the universal-joint frame 4.

Moreover, it should be noted that despite the fact that he is restricted to the co-pilot's seat, the observer can follow the sight over a sufficiently wide field and effect the pointing of the telescope by simple head movements corresponding to direct reflexes. Moreover, these movements cannot communicate vibrations or jerks in view of the organic discontinuity caused by the air gap of the bar magnets.

Finally it should be noted that since the pilot is informed of the approximate bearing of the telescope through the articulation member of the brace 7 there is no risk of the sighting being disturbed by finding and transmitting said bearing.

Needless to say, the invention is not limited to the details of the embodiment which has just been described and these may be modified without going outside the scope of the invention.

For example, the brace 7 could have a different shape from that illustrated, for example the shape of a fork; moreover, said brace could carry one of the bar magnets.

What I claim is:

1. A device for the suspension and pointing of a telescope on a vehicle having an observer's seat which is subject to vibration as in a helicopter, comprising a bracket fixed to said seat, a telescope, an arm rigidly connected to said telescope, a joint having two axes of free rotation with respect to said bracket between said bracket and said arm, one axis for bearing and the other axis for elevation, said axes intersecting at a point in the vicinity of the observer's cervical vertebrae, at least one weight balancing said arm and said telescope in substantially neutral equilibrium about the center of said joint, an eye-piece for said telescope with spaced between said eye-piece and said joint for the head of the observer using said telescope, and a brace connected to the observer's head, said brace being articulated about a point coincident with said first named point permitting movement of the observer's head during the use of said telescope and connecting means between said brace and said telescope.

2. A device as described in claim 1, said brace extending from the rear over the top of the observer's head and being connected to the observer's head adjacent the observer's forehead.

3. A device for the suspension and pointing of a telescope on a vehicle having an observer's seat which is subject to vibration as in a helicopter, comprising a bracket fixed to said seat, a telescope, an arm rigidly connected to said telescope, a joint having two axes of free rotation with respect to said bracket between said bracket and said arm, one axis for bearing and the other axis for elevation, said axes intersecting at a point, said arm and said telescope being balanced in substantially neutral equilibrium about the center of said joint, an eye-piece for said telescope with space between said eye-piece and said joint for the head of the observer using said telescope, a brace connected to the observer's head, articulation members for said brace permitting movement of the observer's head during use of said telescope and connecting means between said brace and said telescope, said brace being attached to said bracket through said articulation members, said members having two axes of free rotation, one axis for bearing and the other axis for elevation, said last named axes intersecting at a point, said second point being coincident with said first point.

4. A device as described in claim 3, including a separable ball and socket joint between said brace and the observer's head.

5. A device as described in claim 3, said connecting means comprising a first bar magnet fixed to said telescope and a second bar magnet fixed to the observer's head.

6. A device as described in claim 5, said magnets being substantially in a line intersecting said points.

7. A device as described in claim 5, said magnets being substantially in extension of one another during sighting of the telescope, adjacent ends of said magnets having opposite polarity.

8. A device as described in claim 7, including a helmet for the observer, said second bar magnet and said brace being fixed to said helmet.

References Cited in the file of this patent

UNITED STATES PATENTS

| | | |
|---|---|---|
| 1,691,733 | Nordin | Nov. 13, 1928 |
| 1,829,614 | Schier | Oct. 27, 1931 |
| 1,939,665 | Crew | Dec. 19, 1933 |
| 2,369,806 | Slonneger | Feb. 20, 1945 |
| 2,392,851 | Kasch | Jan. 15, 1946 |
| 2,491,229 | Taylor | Dec. 13, 1949 |
| 2,518,632 | O'Brien et al. | Aug. 15, 1950 |
| 2,685,233 | Rose | Aug. 3, 1954 |

FOREIGN PATENTS

| | | |
|---|---|---|
| 232,643 | Switzerland | Sept. 1, 1944 |
| 1,035,987 | France | Apr. 22, 1953 |
| 1,187,350 | France | Mar. 2, 1959 |